No. 851,728. PATENTED APR. 30, 1907.
W. J. BAYRER.
SPINDLE DRIVE.
APPLICATION FILED SEPT. 29, 1906.
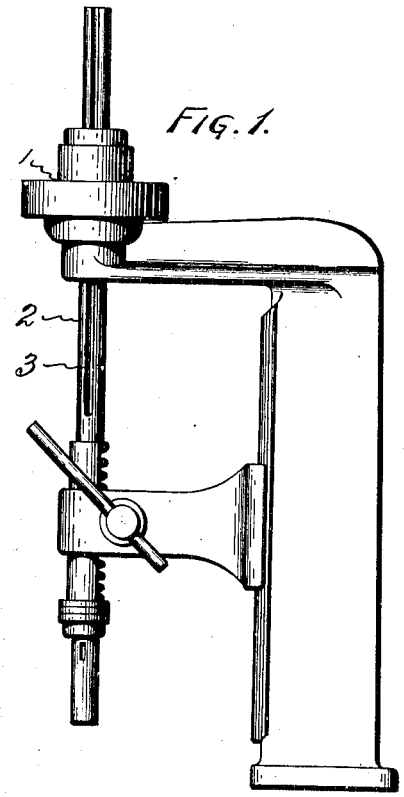
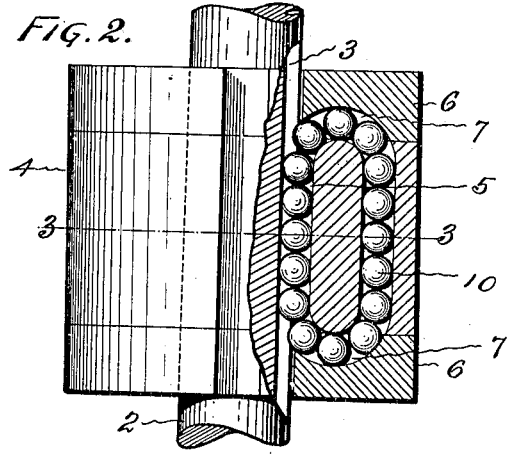
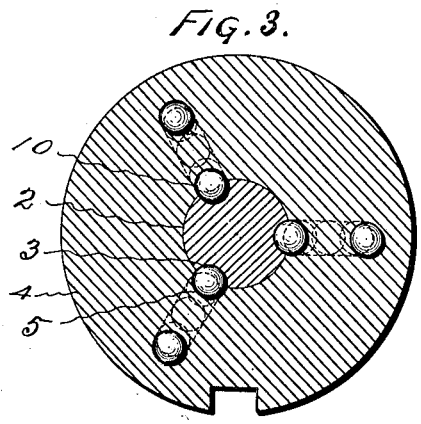
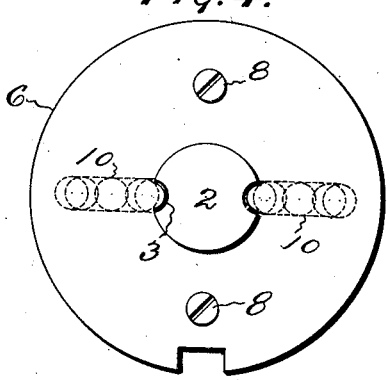
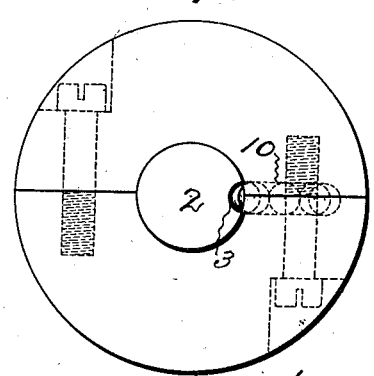
WITNESSES:
S. S. Grotta.
Ethel M. Lowe.
INVENTOR:
William J. Bayrer,
Harry R. Williams
ATTORNEY.

UNITED STATES PATENT OFFICE.

WILLIAM J. BAYRER, OF HARTFORD, CONNECTICUT, ASSIGNOR TO THE HENRY & WRIGHT MANUFACTURING COMPANY, OF HARTFORD, CONNECTICUT, A CORPORATION OF CONNECTICUT.

SPINDLE-DRIVE.

No. 851,728.　　　Specification of Letters Patent.　　　Patented Apr. 30, 1907.

Application filed September 29, 1906. Serial No. 336,787.

*To all whom it may concern:*

Be it known that I, WILLIAM J. BAYRER, a citizen of the United States, residing at Hartford, in the county of Hartford and State of Connecticut, have invented a new and useful Spindle-Drive, of which the following is a specification.

This invention relates to a means for connecting a pulley or gear and a rotary and reciprocatory spindle or shaft. This means is useful for connecting any class of pulley or gear with any kind of vertical or horizontal shaft or spindle so that one part will be rotated by the rotation of the other part but one may be freely moved axially of the other. The invention, however, is particularly adapted for connecting a driving pulley with the drill spindle of a drill press and is, therefore, illustrated and described herein as designed for such use.

The object of the invention is to provide a simple and strong means for connecting a pulley or gear with a rotatory and reciprocatory spindle or shaft in such manner that the spindle or shaft will be positively rotated but may be reciprocated very freely even though the torsional strain between the parts is great.

In the forms of the invention illustrated the pulley bushing has one, two or three longitudinally extending endless channels containing balls and the spindle has a corresponding number of longitudinally extending grooves into which portions of some of the balls project so as to lock the parts together rotarily but permit free longitudinal movement of the spindle.

Figure 1 of the accompanying drawings shows a side elevation of the column of a drill press supporting a spindle that is connected with the pulley by one of these drives. Fig. 2 shows a side elevaton of a portion of the spindle and the pulley bushing with part of the latter cut away to expose the interior. Fig. 3 shows a section of the spindle and pulley bushing on the plane indicated by the line 3—3 on Fig. 2. Fig. 4 is a plan showing a modified form of the same. And Fig. 5 shows a similar view of another modification.

The driving pulley 1 may be a simple pulley or a cone pulley having any number of steps and the spindle 2 may be any diameter and length and may be raised and lowered in the usual way.

The spindle may have one, two, three or more, but preferably three, semi-circular grooves, 3, extending parallel with its axis.

The bushing 4 of any suitable length and diameter, that is located in and preferably keyed to the hub of the pulley has one, two, three or more, channels 5. These channels of course correspond in size and number with those in the spindle. Caps 6 with curved grooves 7 are placed over the ends of the bushing and preferably fastened in place by screws 8 so as to make the channels continuous. These channels are so made that when the parts are put together they form endless ways and these ways are filled with balls 10. The channels are so arranged that when the bushing or hub of the pulley of which it practically forms a part is applied to the spindle the inner rows of balls project into the longitudinal grooves in the spindle and spline the parts together.

Fig. 3 of the drawings shows three sets of balls; Fig. 4, two sets, and Fig. 5 one set. The number of sets of balls used depends upon the amount of strain that the balls are to be subjected to but it is preferred to use three sets of balls, for in that case the balls not only strongly hold the parts together rotarily and allow free reciprocation of the spindle but also serve to hold the spindle against any sidewise movement. This allows the fit between the interior of the bushing or pulley hub to be loose, thus reducing friction and saving labor in manufacture.

The invention is adapted to a split pulley hub as is shown in Fig. 4. In this case parts of the channel may be milled in each face of the split hub and the balls inserted before the halves are put together and fastened.

When a drill spindle and its driving pulley are connected after the manner of this invention, the spindle may be equally well rotated in either direction by the rotation of the pulley and the spindle may be moved longitudinally very easily even if subjected to great torsional strain, as when holding a drill that is being used to drill a large hole.

The splining part is usually made long so that the connection is firm and the posts may be fitted without materially weakening the spindle.

This drive is especialy serviceable for use in connection with tapping tools. In the ordinary construction the friction is sometimes so great between the key or spline which connects the pulley and the spindle that when fine threads are being cut the threads are stripped and the work ruined. With the construction which forms the subject of this invention the torsional friction is so slight that it is negligible.

The invention claimed is:—

1. The combination of a rotatory and reciprocatory spindle having grooves extending in straight lines parallel with its axis, means for rotating and reciprocating the spindle, a bushing in the hub of the rotating means and having endless channels, and balls occupying the channels in the bushing and projecting into the grooves in the spindle, substantially as specified.

2. The combination of a rotatory and reciprocatory spindle having grooves extending in straight lines parallel with its axis, means for rotating and reciprocating the spindle, a bushing in the hub of the rotating means and having endless channels, balls occupying the channels in the bushing and projecting into the grooves in the spindle and caps fastened to the ends of the bushing and closing the channels, substantially as specified.

WILLIAM J. BAYRER.

Witnesses:
 ETHEL M. LOWE,
 HARRY R. WILLIAMS.